(12) United States Patent  (10) Patent No.: US 7,035,320 B2
Sawa et al.  (45) Date of Patent: Apr. 25, 2006

(54) COMMUNICATION APPARATUS, FREQUENCY SPECTRUM INVERSION METHOD AND PROGRAM STORAGE MEDIUM

(75) Inventors: Kazuhiro Sawa, Higashihiroshima (JP); Manabu Toda, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 846 days.

(21) Appl. No.: 09/729,169

(22) Filed: Dec. 5, 2000

(65) Prior Publication Data

US 2001/0024963 A1    Sep. 27, 2001

(30) Foreign Application Priority Data

Mar. 15, 2000  (JP)  ............................. 2000-072213

(51) Int. Cl.
  *H04B 17/02*  (2006.01)
  *H04M 11/00*  (2006.01)
(52) U.S. Cl. ...................................... 375/211
(58) Field of Classification Search ................ 375/211, 375/214, 240.21; 327/119, 121
  See application file for complete search history.

(56) References Cited

U.S. PATENT DOCUMENTS

| | | | |
|---|---|---|---|
| 4,802,219 A |   | 1/1989 | Tjerlund |
| 4,817,141 A | * | 3/1989 | Taguchi ........................ 380/269 |
| 5,247,567 A |   | 9/1993 | Hirano |
| 5,509,028 A |   | 4/1996 | Marque-Pucheu |
| 5,757,921 A |   | 5/1998 | Okanobu et al. .............. 380/38 |
| 5,949,878 A |   | 9/1999 | Burdge et al. |
| 5,970,410 A | * | 10/1999 | Carney et al. ............... 455/446 |
| 5,982,305 A |   | 11/1999 | Taylor |

FOREIGN PATENT DOCUMENTS

| | | |
|---|---|---|
| JP | 4-180415 | 6/1992 |
| JP | 4-342346 | 11/1992 |
| JP | 7-273864 | 10/1995 |
| JP | 8-265211 | 10/1996 |
| JP | 11-196019 | 7/1999 |
| WO | WO 96/11555 | 4/1996 |

OTHER PUBLICATIONS

Vuerinckx et al., "Design of a Very High Resolution Network Analyser", Proceedings of the Instrumentation and Measurement Technology Conference, Orvine, CA, May 18-20, 1993, New York, pp. 470-475.
Rudi Vuerinckx et al.,; "Design Of A Very High Resolution Network Analyser"; IEEE, pp. 470-475, May 1993.
Office Action of EP App. No. 00125908.4-2411, dated Jan. 28, 2005.
Japanese Office Action mailed Nov. 2, 2004 in corresponding JP application No. 2000-072213.

* cited by examiner

*Primary Examiner*—Kevin Kim
(74) *Attorney, Agent, or Firm*—Nixon & Vanderhye, PC

(57) ABSTRACT

Signals with transmission frequencies from hand sets are received by a receiver. The whole frequency spectrum including the received signals whose frequency is converted by the receivers inverted by a signal processor. Then, the received signals included in the frequency spectrum inverted by the signal processor is converted by a transmitter and retransmitted as signals with reception frequencies of the hand sets. By using this communication apparatus, a communication system with fixed duplex intervals can be employed with a simple configuration at a low cost, transmission/reception frequencies can be readily set and duplex conversation between hand sets can be achieved.

14 Claims, 9 Drawing Sheets

COMMUNICATION APPARATUS, FREQUENCY SPECTRUM INVERSION METHOD AND PROGRAM STORAGE MEDIUM

BACKGROUND OF THE INVENTION

The present invention relates to a communication apparatus for converting the frequency of a received signal from a plurality of hand sets and retransmitting the signal. In particular, the present invention relates to a communication apparatus as radio relay means for conversation between hand sets such as a cordless phone, mobile phone and the like.

Conventional communication apparatuses include a cordless phone for conversation between hand sets via a base station wherein adjacent channels are used for conversation between hand sets to perform processing of a radio frequency part and processing of intermediate frequency of radio signals on the same circuit and the frequency of a received radio frequency signal is converted and the signal is retransmitted (Japanese Patent Laid-Open Publication No. Hei 4-180415).

There is also another communication apparatus wherein conversation between hand sets is performed by simplex operation for alternating between transmission and reception depending on the time (Japanese Parent Laid-Open Publication No. Hei 4-342346). This communication apparatus switches the conversation direction by generating/receiving (control) signals for switching between transmission and reception.

Furthermore, there is another communication apparatus which has a radio configuration capable of simultaneous communication on a plurality of channels by a radio with a press-to-talk (simplex) system using a wideband radio transceiving unit (Japanese Patent Laid-Open Publication No. Hei 11-196019).

By the way, the above-described communication apparatuses are advantageous in that conversation between hand sets is enabled by using only one radio unit, but has problems (1) to (4) as below.

(1) In the "communication apparatus for converting the frequency of a received radio frequency signal and retransmitting the signal" of Japanese Patent Laid-Open Publication No. Hei 4-180415, conversation between hand sets is impossible in a communication system with fixed duplex intervals since a transmit signal is obtained within 380 MHz band by synthesizing a 130 MHz signal to a received signal within 250 MHz band.

A basic communication apparatus having a plurality of radio units as shown in FIG. 9, in order to enable conversation between hand sets, a base station is usually provided with a duplexer 151 to which an antenna 152 is connected, two sets of receivers (123–128), a signal processor 140 for processing a signal from each receiver, two sets of transmitters (132–134) to which a signal from the signal processor 140 is connected, two sets of local oscillators 150, a handset 160, telephone line I/F 170 and a control and I/O unit 180. If one hand set transmits a signal at 254.1 MHz when the duplex intervals are fixed at 130 MHz, the base station receives the signal at 384.1 MHz and if the other hand set transmits a signal at 255.1 MHz, the base station receives the signal at 385.1 MHz. Therefore, so that two hand sets communicate via the base station, the base station needs to convert the transmission frequency of one hand set, 254.1 MHz, to the reception frequency of the other hand set, 385.1 MHz, and the transmission frequency of the other hand set, 255.1 MHz, to the reception frequency of this hand set, 384.1 MHz. as shown in FIG. 10, however, there is a problem with the method of the abovementioned publication that since 130 MHz is simply added to a signal received by the base station, a communication system with fixed duplex intervals cannot be employed for this method (254.1 MHz becomes 384.1 MHz and the signal is returned to the first hand set itself).

(2) In the "communication apparatus wherein adjacent channels are used for conversation between hand sets to perform processing of radio frequency part of radio signals and processing of intermediate frequency on the same circuit" of Japanese Patent Laid-Open Publication No. Hei 4-180415, there is a problem that an adjacent unassigned channel needs to be prepared at the start of the conversation and the frequency cannot be arbitrarily selected since adjacent channels are used. Also, since a modulation system of demodulating each channel is employed in this communication apparatus, a circuit for separating each signal at a certain stage during signal processing to handle signals is needed. Therefore, there is a problem that the configuration is complicated and thereby the cost is high.

(3) In the "communication apparatus for achieving conversation between hand sets by a simplex operation system switching between transmission and reception depending on the time" of Japanese Patent Laid-Open Publication No. Hei 4-342346, there is a problem that since simultaneous conversation is impossible, the user accustomed to a duplex operation system finds the simplex operation unnatural. For example, even if one wants to say something while the other person is talking and utter something in the state, nothing is received at the other person.

(4) In the "communication apparatus having a radio configuration capable of simultaneous communication on a plurality of channels by a press-to-talk system using a wideband radio transceiver", there is also a problem that duplex conversation between hand sets is impossible as is the case with the above (3).

SUMMARY OF THE INVENTION

Accordingly, an object of the present invention is to provide a communication apparatus capable of responding to a communication system with fixed duplex intervals with a simple configuration at a low cost and readily setting transmission/reception frequencies and achieving duplex conversation between hand sets.

In order to achieve the above object, there is provided a communication apparatus for converting a frequency of received signals from a plurality of hand sets and retransmitting the signals; having a whole spectrum inverter for inverting a frequency spectrum including the received signals from the plurality of hand sets; said communication apparatus, wherein the plurality of received signals included in the frequency spectrum inverted in the whole spectrum inverter are retransmitted.

According to the communication apparatus constituted as above, when a pair of hand sets communicate therebetween among a plurality of hand sets, two signals with different transmission frequencies are received from the two hand sets. The whole frequency spectrum including the two received signals are inverted by the whole spectrum inverter. Then, a plurality of received signals included in the frequency spectrum inverted by the whole spectrum inverter are retransmitted. Consequently, transmitted and received signals in communication between hand sets with fixed duplex intervals (intervals of transmission and reception frequencies) can be transmitted and received simultaneously by a pair of wideband receiving means and transmitting means. Therefore, a communication system with fixed duplex intervals can be employed with a simple configuration at a low cost without specially causing the hand sets to change their transmission and reception frequencies only in the case of communication between hand sets or having a plurality of sets of transmitters and receivers. Also, transmission and reception frequencies can be readily set and duplex conversation between hand sets can be achieved.

According to the communication apparatus constituted as above, communication between hand sets using the same duplex interval can be achieved without causing hand sets specially to change the transmission/reception frequency only in the case of communication between hand sets or providing a base station with a plurality of sets of transmitters and receivers. Also, in the communication system using the same duplex intervals, communication between hand sets can be performed in duplex operation and the users can transmit voice or the like simultaneously. Thus, convenience is improved. Further, as compared with the simplex operation system, users do not hear switching signals as noise during communication since no excess switching signals are generated. Also, the apparatus can be constituted without providing a plurality of circuits as part of the signal processing for communication between hand sets as in the case of the prior art and thereby it has advantage in the circuit size, overall size, power consumption, cost of parts and so forth. Even in the case where the signal processing is performed by a DSP, signal processing time is reduced and time is saved for other processing since a plurality of processings are not performed separately. Thus, a high-performance communication system can be provided. Also, in the case where only one function is used, power consumption can be reduced since the processing speed of the DSP can be reduced.

In one embodiment of the present invention, the communication apparatus further has filters for attenuating signal components other than the plurality of received signal components included in the frequency spectrum inverted by the whole spectrum inverter; said communication apparatus, wherein the plurality of received signals included in the frequency spectrum outputted from the filters are retransmitted.

According to the communication apparatus of the above embodiment, since a filter is provided for attenuating frequency components other than the plurality of received signal components included in the frequency spectrum inverted by the whole spectrum inverter, retransmission of unnecessary signals is prevented. Thus, communication quality can be improved and other communications are not interfered.

In one embodiment of the present invention, the communication apparatus further has a partial spectrum inverter for inverting a frequency spectrum for each spectrum of the plurality of received signals included in the frequency spectrum.

According to the communication apparatus of the above embodiment, since a partial spectrum inverter is provided, inversion of the inputted frequency spectrum (side band) is reverted and communication between hand sets is enabled even by a modulation system such as a phase modulation or the like affected by frequency spectrum inversion.

In one embodiment of the present invention, the partial spectrum inverter is arithmetic signal processing means.

According to the communication apparatus of the above embodiment, since the partial spectrum inverter becomes complicated if made by circuit components, the partial spectrum inverter is achieved by an arithmetic signal processing means such as DSP or the like. Since the signal processing of the partial spectrum inverter is performed by algorithm, the circuit size can be reduced.

In one embodiment of the present invention, the whole spectrum inverter is frequency converting means.

According to the communication apparatus of the above embodiment, the circuit configuration can be simplified and the circuit size can be reduced by constituting the whole spectrum inverter by frequency converting means.

In one embodiment of the present invention, the whole spectrum inverter and the partial spectrum inverter are arithmetic signal processing means.

According to the communication apparatus of the above embodiment, mass-production effects are increased by computing all the signal processings by the arithmetic signal processing means without depending on the transmitting/receiving means, since the arithmetic signal processing means can be manufactured as a general-purpose component without depending on the frequency allocation of the communication system.

In one embodiment of the present invention, the partial spectrum inverter is provided before the whole spectrum inverter.

According to the communication apparatus of the above embodiment, low power consumption is achieved by disposing the partial spectrum inverter before the whole spectrum inverter so that filter operation or the like executed at the beginning of the partial frequency spectrum inversion can be executed with a low sampling frequency.

Also, there is provided a frequency spectrum inversion method comprising steps of:

sampling signals by a predetermined sampling frequency;

complementing sample data obtained by the sampling to convert a sampling rate; and extracting by a bandpass filter only a spectrum of the signal, generated by the sampling, whose frequency spectrum is inverted out of frequency spectrums after the conversion of the sampling rate.

According to the frequency spectrum inversion method, the frequency spectrum inversion can be achieved by digital signal processing.

Also, there is provided a frequency spectrum inversion method comprising steps of:

sampling signals by a predetermined sampling frequency;

decimating sample data obtained by the sampling to convert a sampling rate; and extracting by a bandpass filter only a spectrum of the signal, generated by the conversion of the sampling rate, whose frequency spectrum is inverted.

According to the frequency spectrum inversion method, frequency spectrum inversion can be achieved by digital signal processing and power consumption can be reduced since the sampling rate can be reduced by decimating the sample data obtained by the sampling in the sampling rate conversion.

Also, there is provided a frequency spectrum inversion method comprising steps of:

sampling signals by a predetermined sampling frequency;

setting part of the sample data obtained by the sampling to zero; and extracting by a bandpass filter or lowpass filter only a spectrum of the signal, generated by setting part of the sample data obtained by the sampling to zero, whose frequency spectrum is inverted.

According to the frequency spectrum inversion method, frequency spectrum inversion can be achieved by digital signal processing and signal processing can be performed by the same clock since the sampling rate is not changed.

Also, there is provided a program storage medium, storing a program for executing the frequency spectrum inversion method according to the present invention.

According to the above program storage medium, flexibility of the system is increased by reading a program of the signal processor using, for example, a general-purpose DSP (digital signal processor) from this program storage medium.

Also, according to the above program storage medium, when another hand set is added to a communication apparatus having one hand set (not requiring communication between hand sets), the program in the program storage medium can be set to alter the system, for example, by reading the program In a DSP of the signal processor created as a general purpose component from this program storage medium so that communication between hand sets is enabled. Also, it is possible to alter the system so that it can respond to a communication system with a different frequency or modulation system.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The communication apparatus of the present invention will be described in detail below with reference to the embodiments shown in accompanying drawings.

First Embodiment

Figure 1:
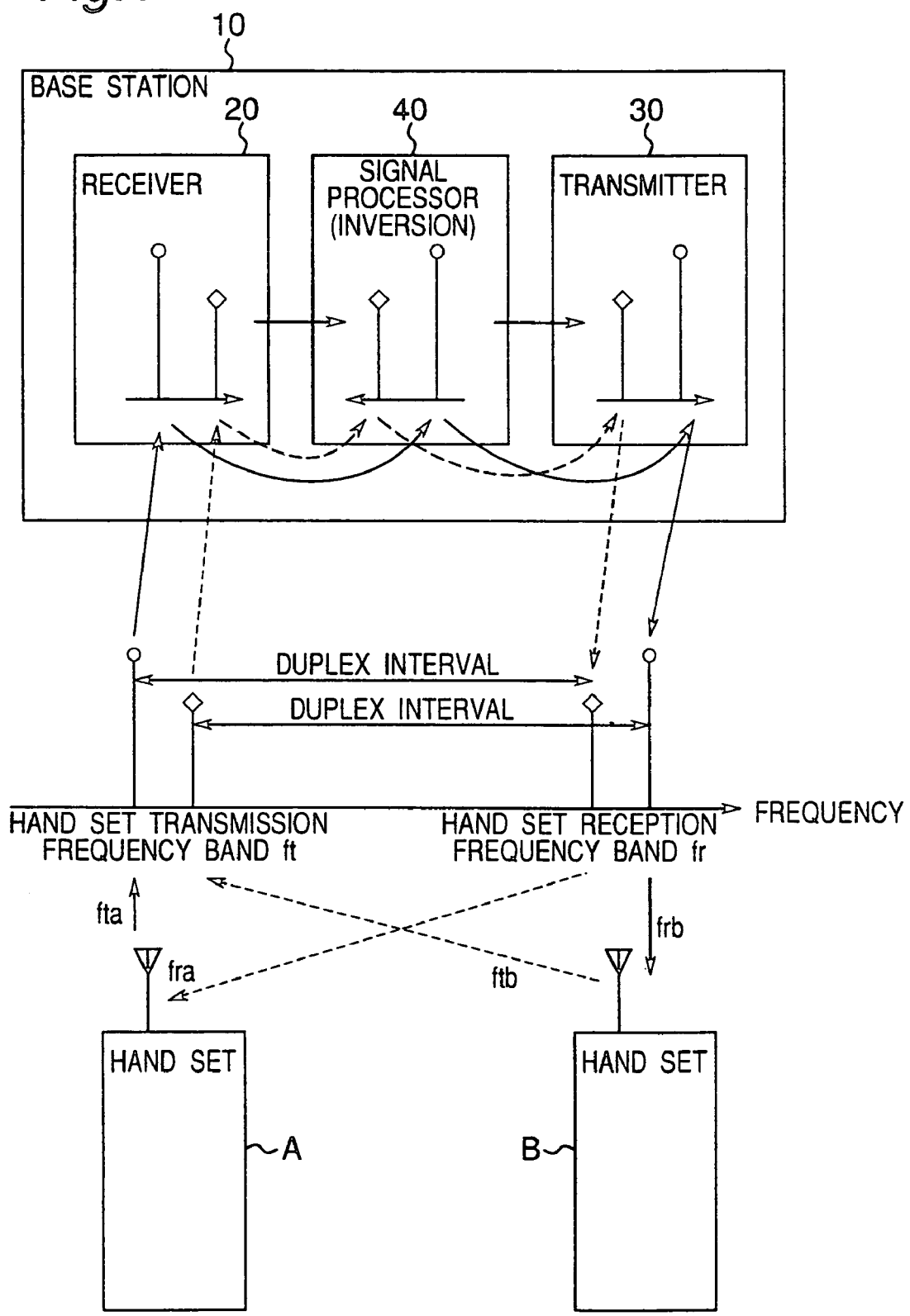
FIG. 1 is a conceptual diagram of conversation between hand sets on a cordless phone having a base station and a plurality of hand sets as a communication apparatus according to a first embodiment of the invention.

FIG. 1 is a conceptual diagram of conversation between hand sets on the cordless phone having a base station and a plurality of hand sets as a communication apparatus according to a first embodiment of the invention. In FIG. 1, A and B denote hand sets. 10 denotes a base station. 20 denotes a receiver of the base station 10. 30 denotes a transmitter of the base station 10. 40 denotes a signal processor as a whole spectrum inverter of the base station 10.

For conversation between a hand set A and a hand set B, it would be good if the hand sets A, B could transmit and receive each other's corresponding frequencies. However, hand sets in a communication system where duplex operation is performed with frequency duplex is constituted by a transmitter capable of handling frequencies in the vicinity of ft (not shown) and a receiver capable of handling frequencies in the vicinity of fr (not shown). For example, if the hand set B transmits transmit signals at the reception frequency fr of the hand set A and receives signals at the transmission frequency ft of the hand set A, the hand sets A and B can directly perform conversation to each other, but this configuration is not realistic because it is complicated and costly. Therefore, hand sets are not constituted such that they transmit and receive the each other's corresponding frequencies, but conversation between hand sets is usually performed via a base station.

Figure 9:
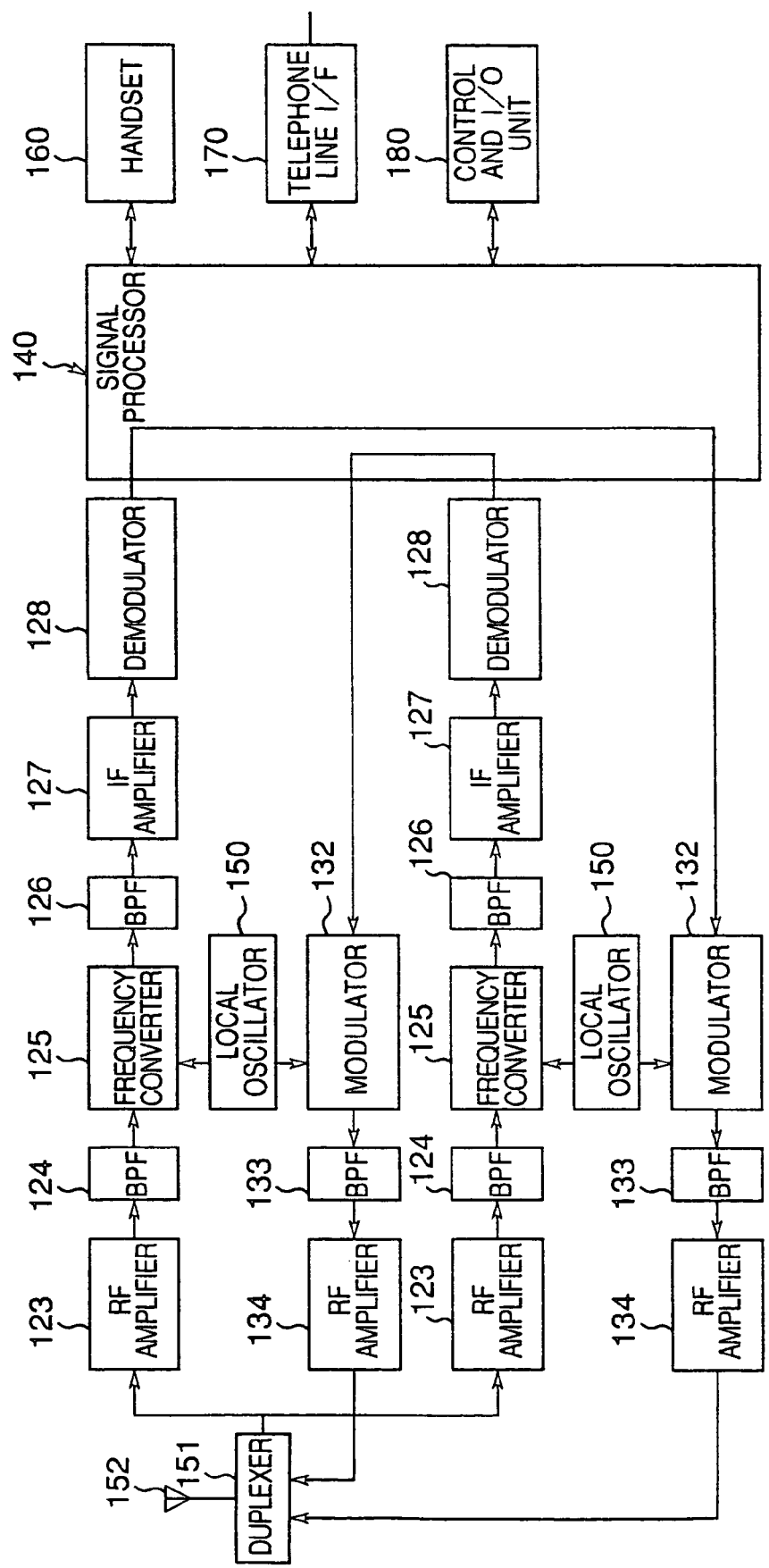
FIG. 9 is a configuration of a base station as a conventional communication apparatus.
Figure 10:
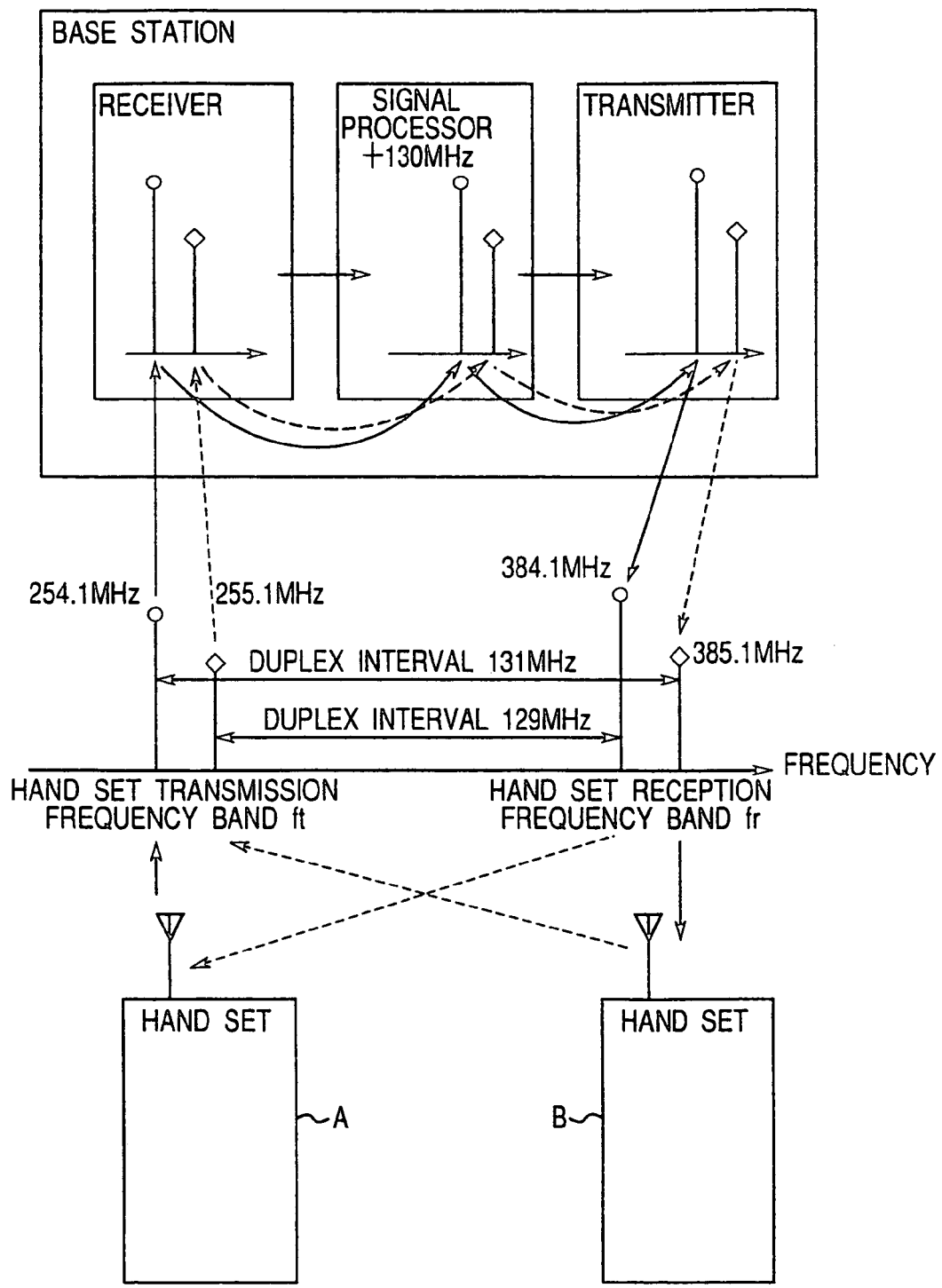
FIG. 10 is a conceptual diagram of conversation between hand sets on a cordless phone having a base station and a plurality of hand sets as a conventional communication apparatus.

Thus, a conventional base station is provided with two sets of transmitters and receivers as shown in FIG. 9 to perform conversation between hand sets. Instead of providing two sets of transmitters and receivers, two signals (signals from one hand set A and the hand set B) can be transmitted and received simultaneously by one set of a transmitter and a receiver. However, if signals are received and transmitted as they are, they are not suitable for a communication system with fixed duplex intervals.

In this first embodiment, a whole spectrum inverter is provided between reception and transmission so that the transmission frequency fta of the hand set A is converted to frb in the base station and at the same time the transmission frequency ftb of the hand set B is converted to fra in the base station. Consequently, conversation between hand sets can be achieved in the communication system with fixed duplex intervals.

Figure 2:
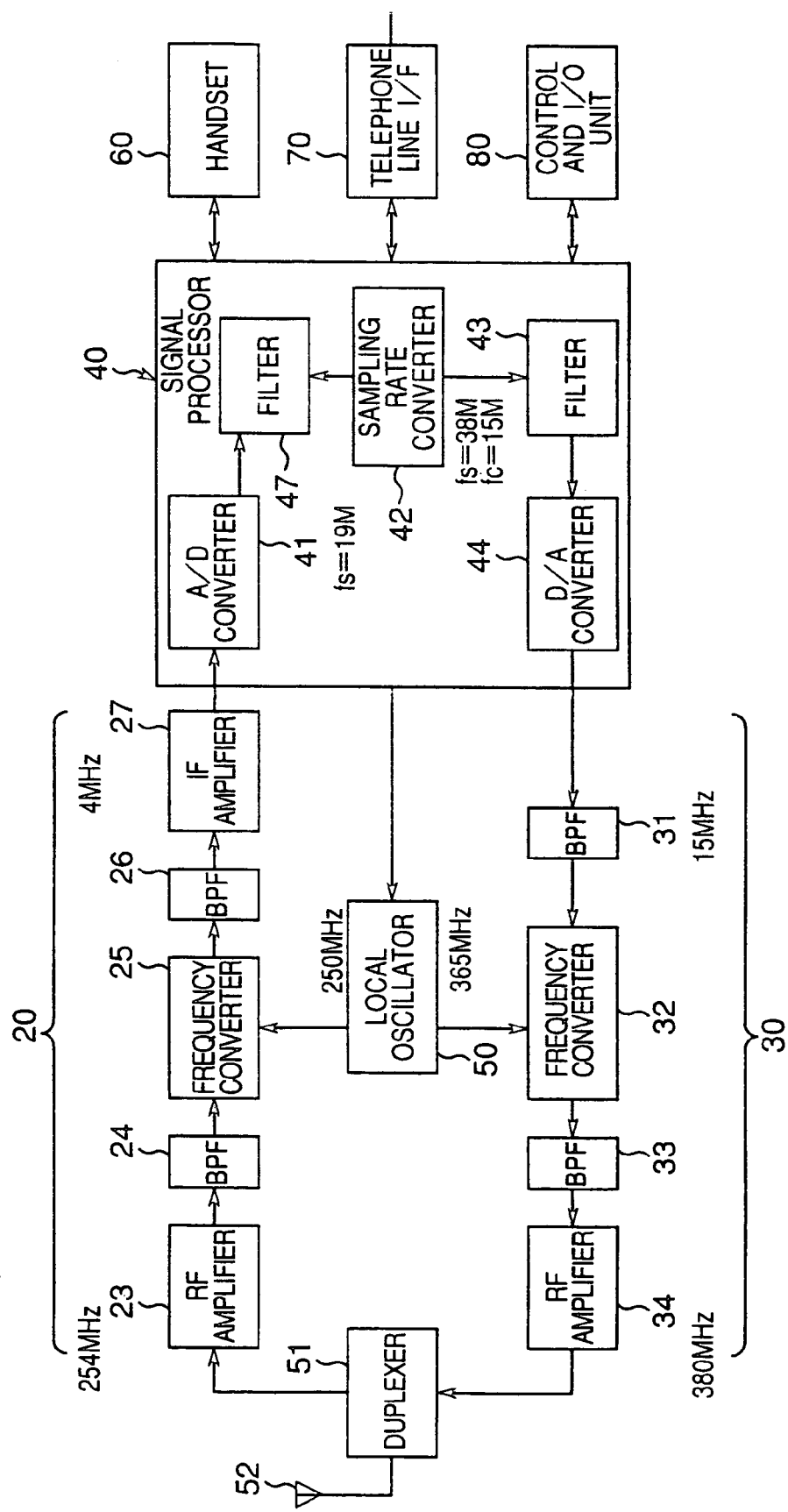
FIG. 2 is a configuration of the base station of the communication apparatus.
Figure 5A:
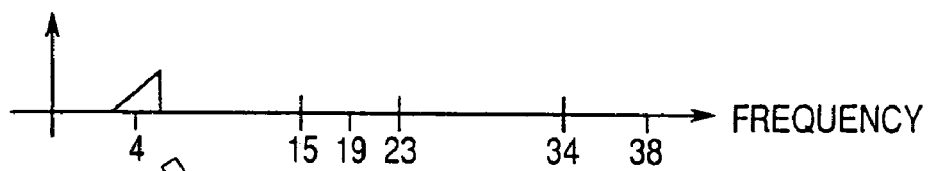
FIGS. 5A–5D are views showing signal waveforms by signal processing in the base station.
Figure 5B:
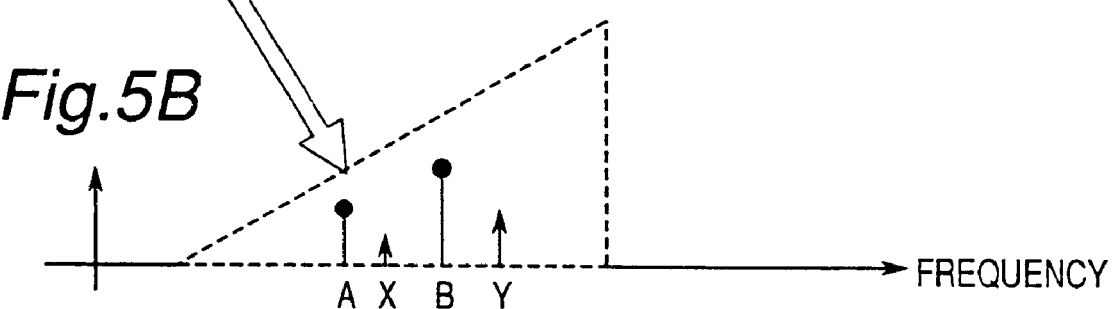

FIG. 2 is a configuration of the base station 10. FIG. 3 is a schematic view of signal frequency spectrums and signal waveforms. The signal processing in the base station 10 will be described in detail below with reference to FIGS. 2 and 3. It is noted that a frequency spectrum when a plurality of receiving waves are combined is represented illustratively by a triangle in FIG. 3 so as to clearly show the inversion of the frequency spectrum. As will be described later, the frequency spectrum represented by this triangle may be the one obtained by combining four frequency components in FIG. 5B as shown in FIG. 5A.

As shown in FIG. 2, an antenna 52 is connected to duplexer 51 in the base station 10 so that output on the reception side of the duplexer 51 is inputted to an RF (radio frequency) amplifier 23. The output of the RF amplifier 23 is inputted to a frequency converter 25 via a BPF (bandpass filter) 24. The output of the frequency converter 25 is inputted to an IF (intermediate frequency) amplifier 27 via a BPF 26. The output of the IF amplifier is 27 is inputted to an A/D converter 41. The output of the A/D converter 41 is inputted to a filter 47. The output of the filter 47 is inputted to a sampling rate converter 42. The output of the sampling rate converter 42 is inputted to the filter 43. The output of the filter 43 is inputted to a D/A converter 44. The output of the D/A converter 44 is inputted to a frequency converter 32 via a BPF 31. The output of the frequency converter 32 is inputted to an RF amplifier 34 via a BPF 33. The output of the RF amplifier 34 is inputted to the transmission side of a duplexer 51.

The RF amplifier 23, BPF 24, frequency converter 25, BPF 26 and IF amplifier 27 constitute a receiver 20. The BPF 31, frequency converter 32, BPF 23 and RF amplifier 34 constitute a transmitter 30. The receiver 20 is constituted by wideband circuits capable of receiving signals within the transmission frequency band of hand sets A, B. The transmitter 30 is constituted by wideband circuits capable of transmitting signals within the reception frequency band of the hand sets A, B.

Also, the A/D converter 41, filter 47, sampling rate converter 42, filter 43 and D/A converter 44 constitute a signal processor 40. Local oscillation signals are supplied from a local oscillator 50 for reception frequency setting signals form the signal processor 40 to the frequency converters 25, 32. Also, a handset 60, telephone line I/F 70 and control and I/O unit 80 are connected to the signal processor 40.

In the base station 10 of the communication apparatus constituted as above, for example, a radio wave (254 MHz) transmitted from the hand set A is received at the antenna 52 and inputted to the receiver 20 by the duplexer 51. The wave passes through the RF amplifier 23 and the BPF 24 and is inputted to the frequency converter 25 in the receiver 20. On the other hand, in the local oscillator 50, a local oscillation signal at 250 MHz is generated in response to an instruction from the signal processor 40 and inputted to the frequency converter 25. An intermediate frequency signal is generated from these two signals and only a 4 MHz signal passes through the BPF 26. Since the inter ed ate frequency signal outputted from this BPF 26 has a local oscillation frequency lower than that of the signal wave, the frequency spectrum of the received signal is not inverted. Then, the intermediate frequency signal is amplified at the IF amplifier 27 and inputted to the signal processor 40.

Figure 3A:
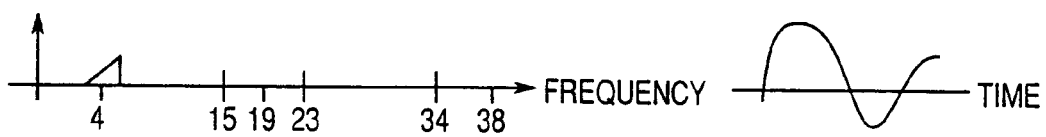
FIGS. 3A–3E are schematic views of signal frequency spectrums and signal waveforms.
Figure 3B:
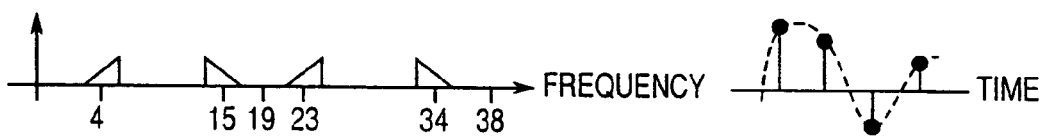

At the signal processor 40, the inputted intermediate frequency signal (shown in FIG. 3A) is sampled at a sampling frequency fs=19 Ms/s (samples/second) by the A/D (analog-to-digital) converter 41 and the analog signal is converted to a digital signal. FIG. 3B shows a signal converted to a digital signal from the analog signal. This signal has an intermediate frequency signal at a position of 4 MHz and a received signal whose frequency spectrum is inverted is generated at a position of 15 MHz (=19 MHz−4 MHz) as a aliasing component.

Figure 3C:
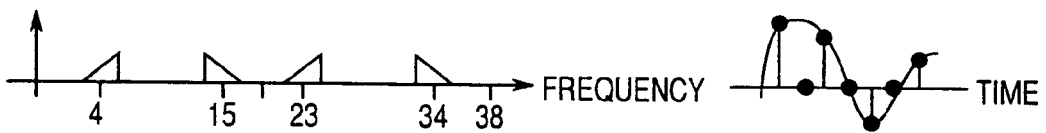

The 0 value is interpolated by the sampling rate converter 42 between sample data assuming a sampling frequency as 38 MHz. FIG. 3C shows a signal for which sampling rate is converged. As shown in FIG. 3C, since the waveform of the signal for which sampling rate is converted is not changed from the signal waveform before the conversion, the frequency spectrum does not change.

Figure 3D:
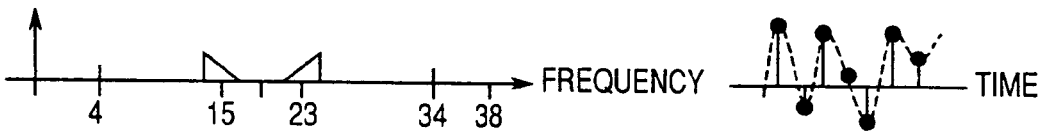

The 15 MHz signal is filtered with the digital filter 43 while the 4 MHz signal is attenuated. Consequently, the 15 MHz intermediate frequency signal whose frequency spectrum is inverted is screened. FIG. 3D shows an output signal of the digital filter 43.

Then, the signal is converted to an analog signal by the D/A (digital-to-analog) converter 44 and outputted to the transmitter 30.

Figure 3E:
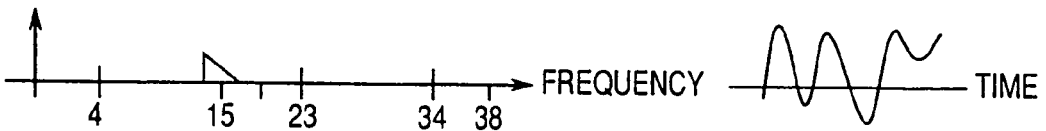

In the transmitter 30, the 15 MHz signal filters the BPF 31 and the BPF 31 attenuates the aliasing components such as 23 MHz or the like. FIG. 3E shows the output of the BPF 31. Subsequently, after the signal is mixed with the local oscillation frequency, 365 MHz, by the frequency converter 32 and the 380 MHz signal whose frequency is converted filters the BPF 33, the signal is amplified to a predetermined signal power by the RF amplifier 34 and is transmitted to the hand set B, which is the other side of conversation, via the duplexer 51 and the antenna 52.

As described above, a signal whose frequency spectrum is inverted can be transmitted by the signal processor 40.

The signal frequency control will be described below. It is noted that fta is a transmission frequency of the hand set A, fra is a reception frequency of the hand set A, ftb is a transmission frequency of the hand set B and frb is a reception frequency of the hand set B. These transmission frequencies fta, ftb and reception frequencies fra, frb are specified by the base station 10 in the one-to-one communication between the base station and the hand set A (or B) and is already known to the control and I/O unit 80 of the base station 10.

First, the control and I/O unit 80 computes the local oscillation frequency fro for reception by the following expression when a request of conversation between hand sets is received from the hand set A, fro=(fta+ftb)/2−4 [MHz]

The local oscillation frequency is transmitted to the signal processor 40 and set in the local oscillator 50.

Therefore, the converted intermediate frequency signal covers the frequency of the hand set A and the frequency of the hand set B, which are disposed so as to be linearly symmetric with reference to 4 MHz. If there is no limit to the transmission frequency fta of the hand set A and the transmission frequency ftb of the hand set B, the local oscillation frequency fro for reception can be the value half of the channel interval. Since the comparative frequency of a synthesizer constituting a local oscillating circuit becomes low, it is preferable to specify (fta−ftb) to be even times of the channel interval.

Then, the 15 MHz intermediate frequency signal for transmission processed in the signal processor 40 coveres the frequency of the hand set B and the frequency of the hand set A, which are disposed to be linearly symmetric with reference to 15 MHz. The frequency spectrum is inverted as described below.

The local oscillation frequency fto for transmission is specified by the following expression:

fto=(fra+frb)/2−15

The transmission/reception interval fdup is obtained as follows.

fdup=fra−fta

=frb−ftb

That is, the interval of the transmission/reception frequency of the hand set A and the interval of the transmission/reception frequency of the hand set B are equal and constant.

If change in transmission frequency fta of the hand set A is successively computed by using the above, the intermediate frequency fia of the reception side converted by the frequency converter 25 is $$fia = fta - fro$$
$$= fta - ((fta+ftb)/2 - 4)$$
$$= 4 + (fta - ftb)/2$$

and the intermediate frequency fja after frequency spectrum inversion is $$fja = 19 - fia$$
$$= 19 - (4 + (fta - ftb)/2)$$
$$= 15 - (fta - ftb)/2$$

Therefore, the frequency fja is the frequency when the spectrum fia is inverted.

Also, the transmission frequency converted by the frequency converter 32 is $$fja + fto = 15 - (fta - ftb)/2 + (fra + frb)/2 - 15$$
$$= (-fta + ftb + fra + frb)/2$$
$$= ((fra - fta) + (ftb + frb))/2$$
$$= (fdup + (frb - fdup + frb))/2$$
$$= frb$$

Thus, the transmission frequency fta of the hand set A is converted to the reception frequency frb of the hand set B and a transmit signal from the hand set A is received by the hand set B.

Similarly, the intermediate frequency fib on the reception side converted by the frequency converter 25 is $$fib = 4 + (ftb - fta)/2$$

The intermediate frequency fjb after the frequency spectrum inversion is $$fjb = 15 - (ftb - fta)/2$$

and the transmission frequency converted by the frequency converter 32 is $$fjb + fto = fra$$

Then, the transmission frequency ftb of the hand set B is converted to the reception frequency fra of she hand set A and thereby a transmit signal of hand set B is received by the hand set A.

Therefore, a communication system with fixed duplex intervals with a simple configuration at a low cost can be employed, the transmission/reception frequencies can be readily set and duplex communication between hand sets can be achieved without specially causing hand sets to change their transmission/reception frequencies only in the case of communication between hand sets or providing a plurality of sets of transmitters and receivers.

Since there is provided a filter 43 for attenuating frequency components other than received signal components included in the frequency spectrum inverted by the signal processor 40 as the whole spectrum inverter, retransmission of unnecessary frequency spectrum is prevented. Thus, other communications are not interfered and the communication quality is improved.

In the signal processor 40, the intermediate frequency signal obtained by converting the frequency of the received signal is sampled by the A/D converter 41 with a predetermined sampling frequency and the sample data obtained by the sampling is complemented by the sampling rate converter 42 to convert the sampling rate. Subsequently, frequency spectrum inversion can be achieved by digital signal processing by using a frequency spectrum inversion method with the filter 43 which allows only the spectrum of signals, generated by the sampling, whose frequency spectrum is inverted out of frequency spectrums for which sampling rate is converted to pass the band.

It is noted that the local oscillation frequency of the reception side is assumed as 250 MHz so that the frequency spectrum is not inverted at the stage of intermediate frequency signal in the first embodiment, but the local oscillation frequency of the reception side can be assumed as 258 MHz so that the frequency spectrum is inverted (whole spectrum inversion) at the stage of intermediate frequency and the frequency spectrum is not inverted at the signal processor.

Second Embodiment

Also, the signal processor can be achieved without using an A/D converter circuit by using an analog signal operation element described in Japanese Patent Laid-Open Publication Nos. Hei 6-162230, 6-168349 and the like application of which belong to the present applicant.

Figure 4:
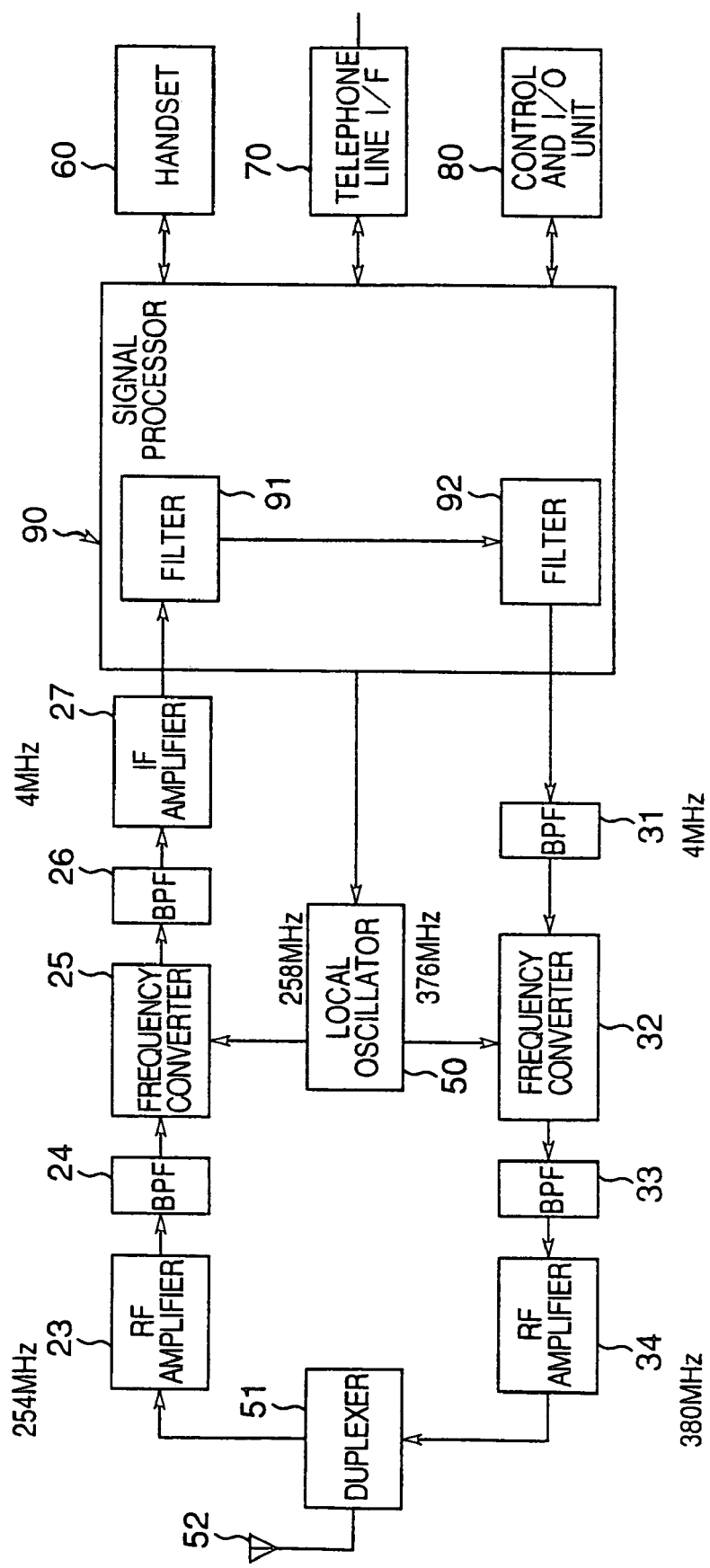
FIG. 4 is a configuration of a base station as a communication apparatus according to a second embodiment of the invention.

FIG. 4 shows a configuration of a base station using this analog signal operation element. Since the frequency spectrum is already inverted (whole spectrum inversion) at the receiver in this base station as described above, frequency spectrum inversion is not necessary at the signal processor.

As shown in FIG. 4, an antenna 52 is connected to duplexer 51 in the base station so that output on the reception side of the duplexer 51 is inputted to an RF amplifier 23. The output of the RF amplifier 23 is inputted to a frequency converter 25 via a BPF 24. The output of the frequency converter 25 is inputted to an IF amplifier 27 via a BPF 26. The output of the IF amplifier 27 is inputted to a filter 91 constituted by an analog signal operation element. The output of a filter 91 is inputted to a filter 92 constituted by an analog signal operation element. The output of the filter 92 is inputted to a frequency converter 32 via a BPF 31. The output of the frequency converter 32 is inputted to an RF amplifier 34 via a BPF 33. The output of the RF amplifier 34 is inputted to the transmission side of a duplexer 51.

The RF amplifier 23, BPF 24, frequency converter 25, BPF 26 and IF amplifier 27 constitute a receiver. The BPF 31, frequency converter 32, BPF 33 and RF amplifier 34 constitute a transmitter. Also, the filters 91, 92 constitute a signal processor 90. A local oscillation signal is supplied from a local oscillator 50 for reception frequency setting signals from the signal processor 90 to the frequency converters 25, 32. Also, the handset 60, telephone line I/F 70 and control and I/O unit 80 are connected to the signal processor 90.

In the base station constituted as described above, received signals are filtered with the BPF 26, but signals on a plurality of channels pass through the BPF 26 for conversation between hand sets. Since there is a possibility that the filtered signals include unnecessary signals (signals transmitted by other hand sets), these are removed and then the signals are retransmitted so that interfering waves are not transmitted to other hand sets. A filter 91 is provided for this purpose. The filter 91 is constituted such that only frequency spectrum of the hand set A and the hand set B, which are in conversation, can pass.

Figure 5C:
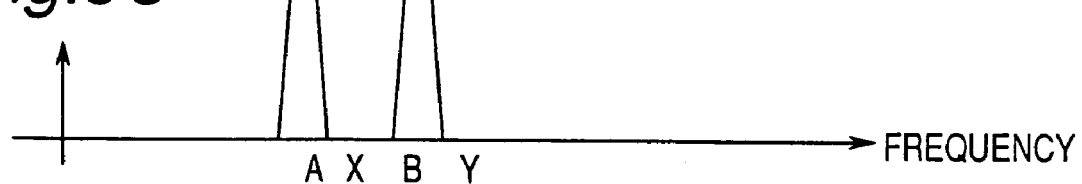
Figure 5D:
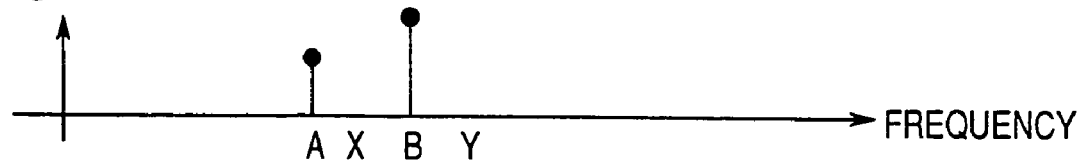

FIG. 5A to 5D show signal waveforms of signal processing by the base station. FIG. 5A shows a frequency spectrum of the input signal shown in FIG. 3A, which is constituted by components shown in FIG. 5B as described with FIGS. 3A–3E. As shown in FIG. 5C, the filter 91 of the signal processor 90 is designed such that the frequency A for the hand set A and the frequency B for the hand set B pass as required. As the output of the filter 91, unnecessary frequency spectrum X and Y are attenuated as shown in FIG. 5D. Therefore, even if these are retransmitted, no interfering wave is generated.

Figure 6:
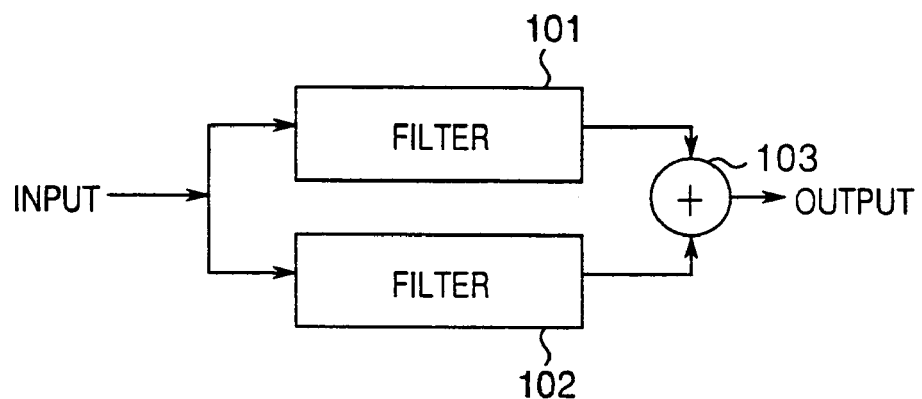
FIG. 6 is a configuration of filters or a signal processor in the base station.

As shown in FIG. 6, this filter 91 can be achieved by inputting the input signals into individual filters 101 and 102 to add each output of the filters 101, 102 by an adder 103.

Thus, the circuit configuration can be simplified and the circuit size can be reduced by constituting the whole spectrum inverter by the frequency converter 25 of the receiver 20 as frequency converting means.

It is noted that the frequency spectrum is inverted at the stage of intermediate frequency of the frequency converter of the receiver in the second embodiment, but the frequency spectrum can be inverted at the frequency converter of the transmitter. That is, the local oscillation frequency of the receiver is assumed as 250 MHz and the frequency spectrum is inverted assuming the local oscillation frequency of the transmitter as 384 MHz instead of inverting the frequency spectrum at the receiver or signal processor.

Third Embodiment

In the first and second embodiments, conversation between hand sets is enabled in a modulation system which does not depend on the frequency spectrum inversion (frequency modulation, amplitude modulation and the like), but, for example, as in the case of a modulation system such as phase modulation or the like, if the signal frequency spectrum is inverted, the phase change is reversed and demodulation cannot be performed normally. In order to solve this, the direction of the frequency spectrum of each signal wave received signal) is changed to the same direction as the received wave in the third embodiment.

Figure 7:
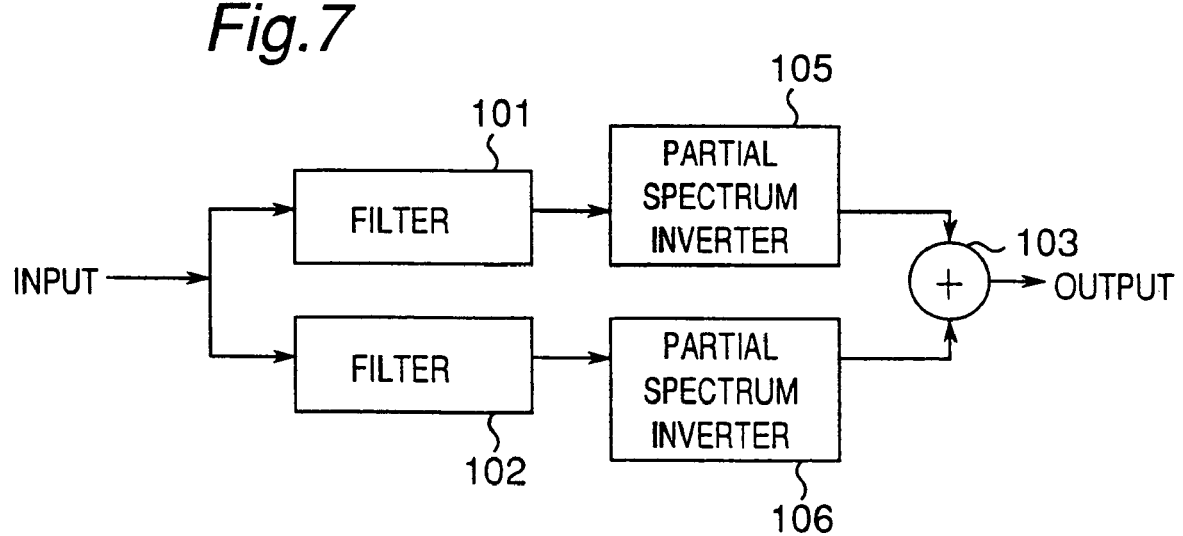
FIG. 7 shows an essential part of a base station of a communication apparatus according to a third embodiment of the invention.

FIG. 7 shows an essential part of a base station as a communication apparatus according to the third embodiment of the invention.

In the third embodiment, the frequency spectrum of the output of the filter for each signal wave of the second embodiment (filters 101, 102 shown in FIG. 6) is inverted by the partial spectrum inverters 105, 106, respectively and each signal whose frequency spectrum is inverted is added by the adder 103 so that the side wave of each received signal is inverted and the whole wave is restored. At this time, since the frequency conversion is performed together with the frequency spectrum inversion, for example, the frequency of the local oscillator of the transmitter is changed to respond to this.

It is noted that the partial spectrum inverters 105, 106 perform the same signal processing as the signal processor 40 in the first embodiment shown in FIG. 2.

Thus, since the partial spectrum inverters 105, 106 are provided, inverted side wave of the inputted received signal is restored and thereby communication between hand sets is enabled even in a modulation system affected by the frequency spectrum inversion such as phase modulation or the like.

Fourth Embodiment

Figure 8A:
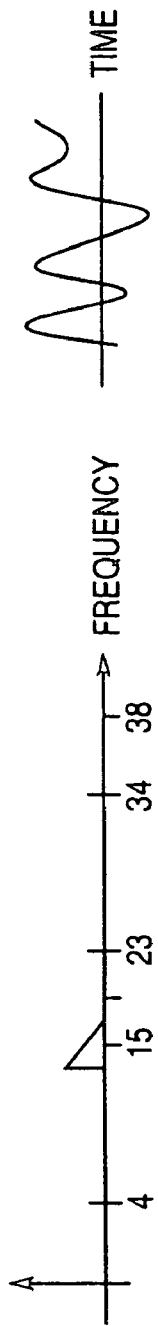
FIGS. 8A–8F show a frequency spectrum inversion method according to a fourth embodiment of the invention.
Figure 8B:
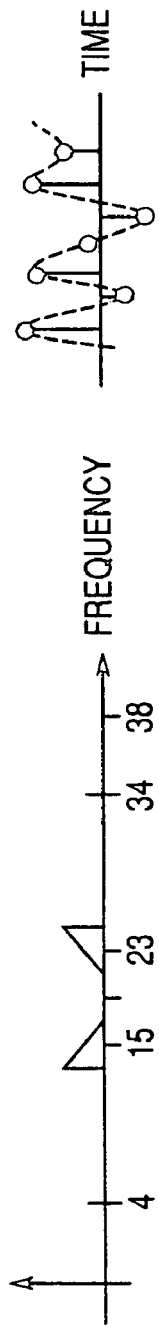

FIGS. 8A to 8E show a frequency spectrum inversion method according to a fourth embodiment of the invention. An input signal spectrum is in the vicinity of 15 MHz and is represented by a triangular symbol (FIG. 8A). If this input signals sampled at 38 MHz, a spectrum is generated at a position of 23 MHz (=38−15) (FIG. 8B).

Figure 8C:
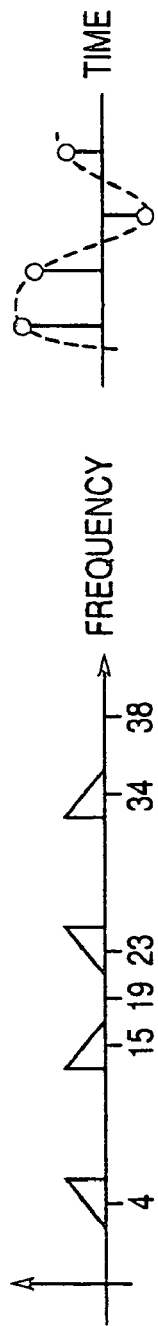
Figure 8D:
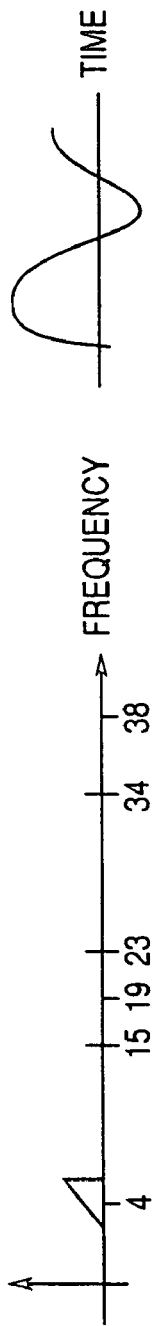

Subsequently, by taking every other sampling data, the sampling frequency is made 19 MHz, which is half of the above signal frequency. Consequently, a spectrum is generated at a position of 4 MHz (=19−15) as shown in FIG. 8C. Then, D/A conversion is performed and the frequency in the vicinity of 4 MHz filters a bandpass filter or lowpass filter so that a signal shown in FIG. 8D is extracted. This signal is a signal obtained by inverting the signal spectrum of FIG. 8A.

In the frequency spectrum Inversion method, the frequency spectrum inversion can be achieved by digital signal processing and power consumption can be reduced since the sampling rate can be made lower by decimating the sample data obtained by sampling in the sampling rate conversion.

Fifth Embodiment

Figure 8E:
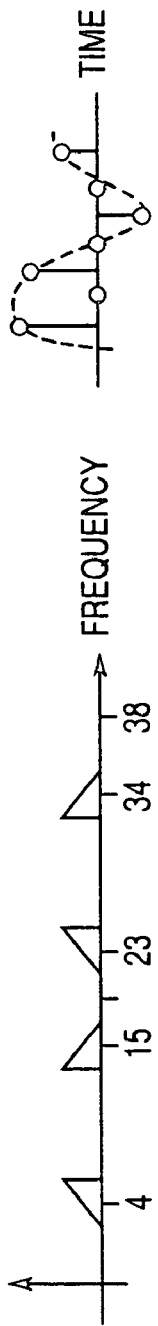
Figure 8F:
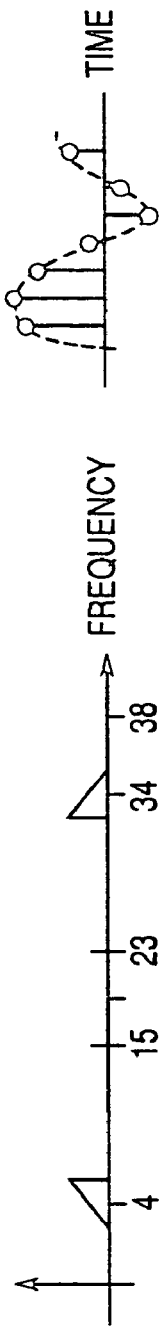

As a frequency spectrum inversion method according to a fifth embodiment of the invention, after the input signal of the fourth embodiment shown in FIG. 8A is sampled at a sampling frequency of 38 MHz, every other data is set 0. Then, a frequency spectrum similar to that of FIG. 8C is generated while the sampling frequency remains 38 MHz (FIG. 8E). Then, the signal shown in FIG. 8E is filtered with the bandpass filter or lowpass filter which pass signals at a frequency in the vicinity of 4 MHz to extract the signal shown in FIG. 8F.

In the frequency spectrum inversion method, the frequency spectrum can be inverted by digital signal processing and signal processing can be performed with the same clock since the sampling rate is not changed. Also, an aperture effect is small. By oversampling, processing can be performed with gradual filter characteristics.

In the first to fifth embodiments, a cordless phone is described as a communication apparatus for performing radio communication, but a communication apparatus is not limited to this. The present invention may be applied to a communication apparatus which converts a frequency of a received signal from a plurality of hand sets and retransmitting the signal. Also, not only to radio, but also the present invention may be applied to a communication apparatus which converts a frequency of a received signal from a plurality of hand sets and retransmitting the signal in communication systems by cable.

Also, a base station as a communication apparatus is described in the first so fifth embodiments, but part or all of programs for executing the frequency spectrum inversion method according to the present invention may be stored in a program storage medium such as a floppy disk, IC card, IC itself or the Like, and then the program may be read, for example, in a DSP (digital signal processor) constituting a signal processor of a communication apparatus to execute the program as required.

If all signal processings of the whole the spectrum inversion part or partial spectrum inverter are operated by the signal processing operation means such as DSP or the like, the signal processing operation means can be manufactured as a general purpose, component without depending on the frequency allocation of a communication system and thereby mass production effect is increased. In this case, filter operation performed first at the partial spectrum inverter can be performed at a low sampling frequency by disposing the partial spectrum inverter before the whole spectrum inverter and thereby power consumption can be reduced.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication apparatus for converting a frequency of received signals from a plurality of hand sets and retransmitting the signals; said communication apparatus comprising:
    a whole spectrum inverter for inverting a frequency spectrum including the received signals from the plurality of hand sets, and
    a partial spectrum inverter for inverting a frequency spectrum for each spectrum of the plurality of received signals included in the frequency spectrum; wherein
    the plurality of received signals included in the frequency spectrum inverted in the whole spectrum inverter is retransmitted.

2. The communication apparatus according to claim 1, wherein
    the partial spectrum inverter is an arithmetic signal processor.

3. The communication apparatus according to claim 1, wherein
    the whole spectrum inverter and the partial spectrum inverter include an arithmetic signal processor.

4. The communication apparatus according to claim 3, wherein the partial spectrum inverter is provided before the whole spectrum inverter.

5. A frequency spectrum inversion method comprising the steps of:
    sampling signals including a first reception signal having a first frequency and a second reception signal having a second frequency, both the first and second frequencies being within a specified frequency band, by a predetermined sampling frequency;
    complementing sample data obtained by the sampling to convert a sampling rate; and
    extracting by a bandpass filter only a spectrum of the signal, generated by the sampling, whose frequency spectrum is inverted out of frequency spectrums after the conversion of the sampling rate so as to extract a second transmission signal having a third frequency corresponding to the first reception signal and a first transmission signal having a fourth frequency corresponding to the second reception signal, both the third and fourth frequencies being within a specified frequency band.

6. A frequency spectrum inversion method comprising the steps of:
    sampling signals including a first reception signal having a first frequency and a second reception signal having a second frequency, both the first and second frequencies being within a specified frequency band, by a predetermined sampling frequency;
    decimating sample data obtained by the sampling to convert a sampling rate; and
    extracting by a bandpass filter only a spectrum of the signal, generated by the conversion of the sampling rate, whose frequency spectrum is inverted so as to extract a second transmission signal having a third frequency corresponding to the first reception signal and a first transmission signal having a fourth frequency corresponding to the second reception signal, both the third and fourth frequencies being within a specified frequency band.

7. A frequency spectrum inversion method comprising the steps of:
    sampling signals including a first reception signal having a first frequency and a second reception signal having a second frequency, both the first and second frequencies being within a specified frequency band, by a predetermined sampling frequency;
    setting part of the sample data obtained by the sampling to zero; and
    extracting by a bandpass filter or lowpass filter only a spectrum of the signal, generated by setting part of the sample data obtained by the sampling to zero, whose frequency spectrum is inverted so as to extract a second transmission signal having a third frequency corresponding to the first reception signal and a first transmission signal having a fourth frequency corresponding to the second reception signal, both the third and fourth frequencies being within a specified frequency band.

8. A storage medium, storing a computer readable program that is executed by a computer,
    wherein said program includes instructions for executing the frequency spectrum inversion method according to claim 5.

9. A storage medium, storing a computer readable program that is executed by a computer,
    wherein said program includes instructions for executing the frequency spectrum inversion method according to claim 6.

10. A storage medium, storing a computer readable program that is executed by a computer,
    wherein said program includes instructions for executing the frequency spectrum inversion method according to claim 7.

11. The frequency spectrum inversion method according to claim 5; wherein
    a value obtained by subtracting the first frequency from the fourth frequency is equal to a value obtained by subtracting the second frequency from the third frequency.

12. The frequency spectrum inversion method according to claim 6; wherein
    a value obtained by subtracting the first frequency from the fourth frequency is equal to a value obtained by subtracting the second frequency from the third frequency.

13. The frequency spectrum inversion method according to claim 7; wherein
    a value obtained by subtracting the first frequency from the fourth frequency is equal to a value obtained by subtracting the second frequency from the third frequency.

14. A communication apparatus comprising:
    a receiver for receiving a signal having a first frequency within a transmission frequency band as a first reception signal from a first hand set and a signal having a second frequency within the transmission frequency band as a second reception signal from a second hand set, a whole spectrum inverter for inverting in a lump a frequency spectrum including the first and second reception signals so that the first reception signal is converted to a second transmission signal having a third frequency within a reception frequency band and the second reception signal is converted to a first transmission signal having a fourth frequency within the reception frequency band, and a transmitter for transmitting the second transmission signal from the whole spectrum inverter to the second hand set and the first transmission signal from the whole spectrum inverter to the first hand set; wherein a value obtained by subtracting the first frequency of the first reception signal transmitted by the first hand set from the fourth frequency of the first transmission signal transmitted to the first hand set is equal to a value obtained by subtracting the second frequency of the second reception signal transmitted by the second hand set from the third frequency of the second transmission signal transmitted to the second hand set in order to achieve a fixed duplex interval communication between the first and second hand sets.

* * * * *